United States Patent Office 3,032,422
Patented May 1, 1962

3,032,422
NUTRITIVE FOOD GLAZE
Justin J. Alikonis, 702 E. Locust St., Bloomington, Ill.
No Drawing. Filed June 15, 1960, Ser. No. 36,175
6 Claims. (Cl. 99—166)

This invention relates generally to improvements and innovations in nutritive food glaze compositions of the general type described, for example, in Patent 2,791,509 to Cosler.

Patent 2,791,509 is directed to nutritive food glaze compositions or so-called "confectioner's glazes" consisting essentially of zein plasticized with an acetylated glyceride ester of a saturated higher fatty acid. The patent emphasizes the unsuitability of non-acetylated materials (e.g. column 5, lines 49–52). However, the use of the acetylated glycerides has encountered the problem of obtaining approval by governmental regulatory bodies since these materials are considered new food additives and the safeness thereof in foods must be demonstrated by the usual long and expensive toxicity tests.

Contrary to the teaching of Patent 2,791,509 it has been discovered in accordance with the present invention that mixtures of mono- and di-glycerides of edible fats and oils having sufficiently high mono-glycerides content (i.e. at least 65%, and preferably at least about 90%) serve very satisfactory as plasticizer materials for zein and other aqueous alcohol-soluble prolamines. An attractive feature of these high mono-glyceride content materials is the fact that they are recognized as natural food products and therefore they can be used in food formulations without any question under the food and drug laws.

These high mono-glyceride content materials can be obtained commercially with mono-glyceride contents of 90% or higher as so-called "molecularly distilled mono-glycerides." They are readily prepared by this technique from refined vegetable and/or animal fats and oils that are high in mono-ester content. These materials can be used to plasticize zein or other prolamines and produce compositions which are readily soluble at room temperature in aqueous alcoholic solutions. Another characteristic of these high mono-ester content glyceride materials is their bland teste, good stability, and freedom from catalysts or soaps. They are plastic fats of low melting points and incorporation problems in nutritive fod glazing compositions are eliminated or reduced to a minimum.

Accordingly, the object of the invention, generally stated, is the provision of new and improved nutritive food or confectioner's glaze compositions having excellent physical characteristics for their intended purpose and which are easily prepared from commercially available materials which are natural products so as not to constitute new food additives.

Certain other objects of the invention will, in part, be obvious and will in part appear hereinafter.

For a more complete understanding of the nature and scope of the invention reference may now be had to the following detailed description thereof wherein a working example and suggested modifications thereof are set forth.

While the two main or essential ingredients of my nutritive food glaze products are zein, or other aqueous alcohol soluble prolamine, and a material comprising a mixture of mono- and di-glycerides of edible fats and oils having a mono-glyceride content of at least 65%, for most applications these two essential ingredients (together with any other minor constituents that may be used such as anti-oxidants) are dissolved in a volatile carrier. Such solutions may be applied by spraying, brushing, dipping, stamping or other known techniques, and the volatile carrier or solvent driven off leaving the nutritive glaze residue in place on the product as desired.

While zein is a preferred prolamine because of its ready availability, favorable cost and excellent and uniform quality, it may be replaced in whole or in part in the following formulations by other similar prolamines such as gliadin (from wheat), hordein (from barley), or kafirin (from kafirin corn). As mentioned, the usual commercial food grade mixtures of mono- and di-glycerides are not suitable for the purposes of this invention. Such commercial products usually have a mono-glyceride content in the range of only about 40–45. In contrast thereto, the materials of choice for practicing the present invention are the molecularly distilled mono-glycerides that are prepared from refined vegetable or animal fats and oils and which have a high content in mono-ester of at least 90%. However, suitable high mono-glyceride materials do not have to be prepared by the molecular distillation technique as there are other methods. Furthermore, the mono-glyceride content may be as low as about 65% while still retaining substantial advantages for purposes of the nutritive food glaze compositions.

Among the various animal fats and vegetable oils that may serve as the base or starting material there may be mentioned: coconut oil, cottonseed oil, soybean oil, corn oil, peanut oil, and the commercial animal fats, such as lard.

Various volatile solvents may be used such as ethyl alcohol, 90% isopropyl alcohol, 90% methyl alcohol, and low molecular weight glycols and glycol ethers. Special solvents such as "Permit Formula 35a" a denatured alcohol which comprises 5 parts by volume of ethyl acetate to 100 parts of ethyl alcohol may also be used.

As mentioned above, in addition to the three main ingredients of the food glaze solutions other components may be included in minor amounts for greater elegance such as antioxidants, flavoring materials, coloring materials, etc.

The proportions of the essential ingredients are not highly critical within fairly broad ranges although certain preferred formulations can be readily developed for special uses by those skilled in the art. In general, the ratio of high mono-glyceride content material consisting essentially of a mixture of mono- and di-glycerides derived from edible fats and oils, may range from about 5% to 50% by weight, dry basis, of the zein or other prolamine. As for adjuncts such as antioxidants, they will be used in minor concentrations as is well known. In solution form the compositions will contain enough volatile solvents so as to be readily applied depending upon the technique of application and use. The following example will illustrate useful proportions:

*Example 1*

Glazing solution was prepared by simply blending the following ingredients in the proportions indicated by weight:

63.66% alcohol (Permit Formula 35a—90% ethyl alcohol)
24.00% zein
12.00% molecularly distilled mono- and di-glycerides
0.17% butylated hydroxyanisole
0.17% butylated hydroxytoluene In the above formulation the molecularly distilled mono-glycerides had the following average chemical and physical characteristics:

| | |
|---|---|
| Monoester content | 90.0% (minimum). |
| Saponification value | 160. |
| Iodine value | 85. |
| Glycerol content | 1.0% (maximum). |
| F.F.A. (as oleic) | 1.5% (maximum). |
| Specific gravity | 0.94 at 60° C. |
| Congeal point | 33° C. |
| Cloud point | 45° C. |

The foregoing food glaze formulation is suitable for treating a variety of confectionery products such for example as roasted nuts, sugar coated confections, etc.

A preferred way of applying the confectioner's glaze solution is to add a small amount, e.g. 1 to 2% by weight, to a product which is being mixed in a revolving pan of the type commonly used in the manufacture of confections. The treating solution will become evenly applied to each piece in the pan and at the same time the solvent will readily evaporate. If desired, the volatization can be accelerated by flowing warm air into the interior of the revolving pan. Alternately, the confection or other food product to be glazed may be placed in a wire basket and the basket dipped into a bath of the glaze solution. By still another technique the solution may be sprayed on the confectionery pieces while they travel on a wire belt.

*Example 2*

Another glazing solution was prepared having the following formulation:

69.66% alcohol (Permit Formula 35a—90% ethyl alcohol)
28.00% zein
2.0% molecularly distilled mono-di-glycerides as in Example 1
0.17% butylated hydroxyanisole
0.17% butylated hydroxytoluene Since certain other changes and modifications in procedure and formulations may be made without departing from the spirit and scope of the invention, the foregoing examples are intended to be interpreted as illustrative and not in a limited sense.

I claim:

1. A nutritive food glaze comprising an aqueous alcohol-soluble prolamine and a mixture of mono- and di-glycerides of edible fats and oils having a mono-glycerides content of at least about 65% by weight.

2. A nutritive food glaze comprising zein and mono- and di-glycerides of edible fats and oils having a mono-glycerides content of at least about 90% by weight.

3. A solution for depositing a nutritive food glaze comprising a volatile carrier consisting essentially of aqueous alcohol, a prolamine, and glycerides of edible fats and oils having a mono-glycerides content of at least about 65% by weight.

4. A solution for depositing a nutritive food glaze comprising, a volatile carrier consisting essentially of aqueous alcohol, zein, and glycerides of edible fats and oils having a mono-glycerides content of at least about 90% by weight.

5. A nutritive food glaze comprising zein and molecularly distilled mono-glycerides obtained from edible fats and oils and having a mono-glycerides content of at least about 90% by weight.

6. A nutritive food glaze comprising zein and from about 5 to 50% by weight of mono-di-glycerides of edible fats and oils having a mono-glycerides content of at least about 65% by weight.

References Cited in the file of this patent

UNITED STATES PATENTS

| | | |
|---|---|---|
| 2,158,481 | Hansen et al. | May 16, 1939 |
| 2,791,509 | Cosler | May 7, 1957 |
| 2,932,574 | Bour | Apr. 12, 1960 |